US012330920B2

(12) United States Patent
Mizuki et al.

(10) Patent No.: US 12,330,920 B2
(45) Date of Patent: Jun. 17, 2025

(54) CRANE AND CRANE CONTROL METHOD

(71) Applicant: TADANO LTD., Kagawa (JP)

(72) Inventors: Kazuma Mizuki, Kagawa (JP); Shinsuke Kanda, Kagawa (JP); Tatsuya Yanagisawa, Kagawa (JP)

(73) Assignee: TADANO LTD., Kagawa (JP)

( * ) Notice: Subject to any disclaimer, the term of this patent is extended or adjusted under 35 U.S.C. 154(b) by 1004 days.

(21) Appl. No.: 16/979,802

(22) PCT Filed: Mar. 19, 2019

(86) PCT No.: PCT/JP2019/011493
§ 371 (c)(1),
(2) Date: Sep. 10, 2020

(87) PCT Pub. No.: WO2019/181953
PCT Pub. Date: Sep. 26, 2019

(65) Prior Publication Data

US 2021/0047153 A1 Feb. 18, 2021

(30) Foreign Application Priority Data

Mar. 19, 2018 (JP) ................................ 2018-051543

(51) Int. Cl.
*B66C 13/22* (2006.01)
*B66C 23/42* (2006.01)
*B66C 13/46* (2006.01)

(52) U.S. Cl.
CPC .............. *B66C 13/22* (2013.01); *B66C 23/42* (2013.01); *B66C 13/46* (2013.01); *B66C 2700/0357* (2013.01); *B66C 2700/08* (2013.01)

(58) Field of Classification Search
CPC ......... B66C 13/22; B66C 23/42; B66C 13/46; B66C 2700/0357; B66C 2700/08; B66C 13/063; B66C 13/48; B66C 23/06
See application file for complete search history.

(56) References Cited

U.S. PATENT DOCUMENTS 5,160,056 A * 11/1992 Yoshimatsu .......... B66C 23/905 212/277
5,806,696 A * 9/1998 Hytonen ................. B66C 13/54 212/270

(Continued)

FOREIGN PATENT DOCUMENTS

CN 104828703 A * 8/2015
JP H03-177299 A 8/1991

(Continued)

OTHER PUBLICATIONS

Machine Translation of CN-104828703-A obtained from Clarivate Analytics on Aug. 23, 2023 (Year: 2015).*

(Continued)

*Primary Examiner* — Fadey S. Jabr
*Assistant Examiner* — Michael J Herrera
(74) *Attorney, Agent, or Firm* — Paratus Law Group, PLLC

(57) ABSTRACT

Provided is a crane including: an operable function part; an actuator; a generation part; a filter part filtering a first control signal and generating a second control signal; a control part controlling the actuator based on the second control signal; and a computation part computing information relating to a flow quantity estimated as the operable function part moving, if a stop signal has been inputted into the actuator at the present position of the operable function part, from when the stop signal has been inputted into the actuator to when the operation of the operable function part stops. The control part outputs the stop signal to the actuator if information relating to the present position of the operable function part, information relating to a target stop position whereat the operable function part is to be stopped, and the information relating to the flow quantity satisfy prescribed conditions.

9 Claims, 7 Drawing Sheets

(56) References Cited

U.S. PATENT DOCUMENTS

| | | | | |
|---|---|---|---|---|
| 5,823,369 | A * | 10/1998 | Kuromoto | B25J 9/1638 212/223 |
| 5,908,122 | A * | 6/1999 | Robinett | B66C 13/063 901/17 |
| 6,442,439 | B1 | 8/2002 | Robinett, III et al. | |
| 6,704,619 | B1 * | 3/2004 | Coleman | G05D 1/0255 701/472 |
| 2006/0074517 | A1 * | 4/2006 | Schneider | B66C 13/063 700/213 |
| 2008/0275610 | A1 | 11/2008 | Terashima et al. | |
| 2011/0147090 | A1 * | 6/2011 | Ditillo | B66C 23/26 175/87 |
| 2012/0239331 | A1 * | 9/2012 | Bageshwar | B66C 13/46 702/92 |
| 2015/0142276 | A1 * | 5/2015 | Wu | E02F 9/2095 701/50 |

FOREIGN PATENT DOCUMENTS

| | | | |
|---|---|---|---|
| JP | H10-310374 | A | 11/1998 |
| JP | H11-139771 | A | 5/1999 |
| JP | 2005-067747 | A | 3/2005 |
| JP | 4023749 | B2 | 12/2007 |
| WO | WO 2005/012155 | A1 | 2/2005 |

OTHER PUBLICATIONS

Nov. 5, 2021, European Search Report issued for related EP Application No. 19772304.2.

May 28, 2019, International Search Report issued for related PCT application No. PCT/JP2019/011493.

May 28, 2019, International Search Opinion issued for related PCT application No. PCT/JP2019/011493.

* cited by examiner

*FIG. 8*

| | | SUSPENSION LENGTH | | | | |
|---|---|---|---|---|---|---|
| | | L(1) | L(2) | L(3) | · · · · · · | L(n) |
| CURRENT SWIVEL SPEED | $\phi$b(1) | $\gamma$(11) | $\gamma$(12) | $\gamma$(13) | · · · · · · | $\gamma$(1n) |
| | $\phi$b(2) | $\gamma$(21) | $\gamma$(22) | $\gamma$(23) | · · · · · · | $\gamma$(2n) |
| | $\phi$b(3) | $\gamma$(31) | $\gamma$(32) | $\gamma$(33) | · · · · · · | $\gamma$(3n) |
| | ⋮ | ⋮ | ⋮ | ⋮ | ⋮ · · · $\gamma$(xy) | |
| | $\phi$b(m) | $\gamma$(m1) | $\gamma$(m2) | $\gamma$(m3) | · · · · · · | $\gamma$(mn) |

M

CRANE AND CRANE CONTROL METHOD

CROSS REFERENCE TO PRIOR APPLICATION

This application is a National Stage Patent Application of PCT International Patent Application No. PCT/JP2019/011493 (filed on Mar. 19, 2019) under 35 U.S.C. § 371, which claims priority to Japanese Patent Application No. 2018-051543 (filed on Mar. 19, 2018), which are all hereby incorporated by reference in their entirety.

TECHNICAL FIELD

The present invention relates to a crane and a crane control method.

BACKGROUND ART

Conventionally, in a crane, luggage is being vibrated during transportation. Such vibrations are caused by a single pendulum having luggage as a mass point, which is suspended at the tip of a wire rope having an acceleration applied during conveyance as a motive force, or a double pendulum having a hook as a fulcrum.

Further, in addition to the vibrations of the single pendulum or the double pendulum, the luggage carried by the crane equipped with the boom vibrates due to the bending of the structures of the crane such as the boom and the wire rope.

The luggage suspended on the wire rope is conveyed while vibrating at the resonance frequency of the single pendulum or the double pendulum, and at the unique frequency in the derricking direction of the boom and the unique frequency in the swivel direction and/or the unique frequency at the time of extending and contracting due to the extension of the wire rope.

In such a crane, in order to stably lower the luggage to a predetermined position, the operator has to use an operation tool to perform an operation of canceling the vibration of the luggage by manually rotating and derricking the boom. Therefore, the transportation efficiency of the crane is affected by the magnitude of vibration generated during transportation and the skill level of a crane operator.

Therefore, there is known a crane to improve the transportation efficiency, in which the crane has a function of suppressing the vibration of the luggage by attenuating the frequency component of the resonance frequency of the luggage from the speed command (basic control signal) of the crane actuator (for example, see Patent Literature 1).

The crane described in Patent Literature 1 calculates the resonance frequency calculated from the rope length (suspension length), which is the distance from the rotation center of the swing wire rope to the center of gravity of the luggage. The crane also generates a filter based on the calculated resonance frequency. The crane generates a filtering control signal by filtering the basic control signal using the generated filter. Then, the crane controls the boom based on the filtering control signal to suppress the vibration of the luggage being conveyed.

CITATION LIST

Patent Literature

Patent Literature 1: Japanese Patent No. 4023749

SUMMARY OF THE INVENTION

Problems to be Solved by the Invention

By the way, in the crane described in Patent Literature 1, in the control based on the filtering control signal, the boom rises more gently than in the control based on the basic control signal. Therefore, there is a possibility that the boom may move by a predetermined distance between the time when the stop signal for stopping the swiveling motion of the boom is input to the actuator and the time when the boom actually stops. As a result, it may be difficult to stop the boom at a desired position.

An object of the invention is to provide a crane and a crane control method capable of stopping a boom at a desired position in control based on a filtering control signal.

Solutions to Problems

An aspect of the crane of the invention includes an operable function part, an actuator that drives the operable function part, a generation part that generates a first control signal of the actuator, a filter part that filters the first control signal to generate a second control signal, a control part that controls the actuator based on the second control signal, and a computation part that calculates, in a case where a stop signal is input to the actuator at a present position of the operable function part, information regarding a flow quantity estimated when the operable function part moves from after the stop signal is input to the actuator until an operation of the operable function part stops. In the control based on the second control signal, the control part outputs the stop signal to the actuator in a case where information regarding a present position of the operable function part, information regarding a target stop position for stopping the operable function part, and information regarding the flow quantity satisfy a prescribed condition.

An aspect of a crane control method according to the invention is performed in a crane. The crane includes an operable function part, an actuator that drives the operable function part, a generation part that generates a first control signal of the actuator, a filter part that filters the first control signal to generate a second control signal, and a control part that controls the actuator based on the second control signal. The crane control method includes calculating, in a case where a stop signal is input at a present position of the operable function part, information regarding a flow quantity estimated when the operable function part moves from after the stop signal is input to the actuator until an operation of the operable function part stops, and outputting, in the control based on the second control signal, the stop signal to the actuator in a case where information regarding a present position of the operable function part, information regarding a target stop position for stopping the operable function part, and information regarding the flow quantity satisfy a prescribed condition.

Effects of the Invention

According to the invention, it is possible to provide a crane and a crane control method capable of stopping a boom at a desired position in control based on a filtering control signal.

BRIEF DESCRIPTION OF DRAWINGS

FIG. 8 is a diagram illustrating a swivel flow angle map.

DESCRIPTION OF EMBODIMENTS

Hereinafter, a crane 1 according to a first embodiment of the invention will be described with reference to FIGS. 1 and 2. In this embodiment, the crane is a mobile crane (rough terrain crane). However, the crane may be various cranes such as a truck crane.

Figure 1:
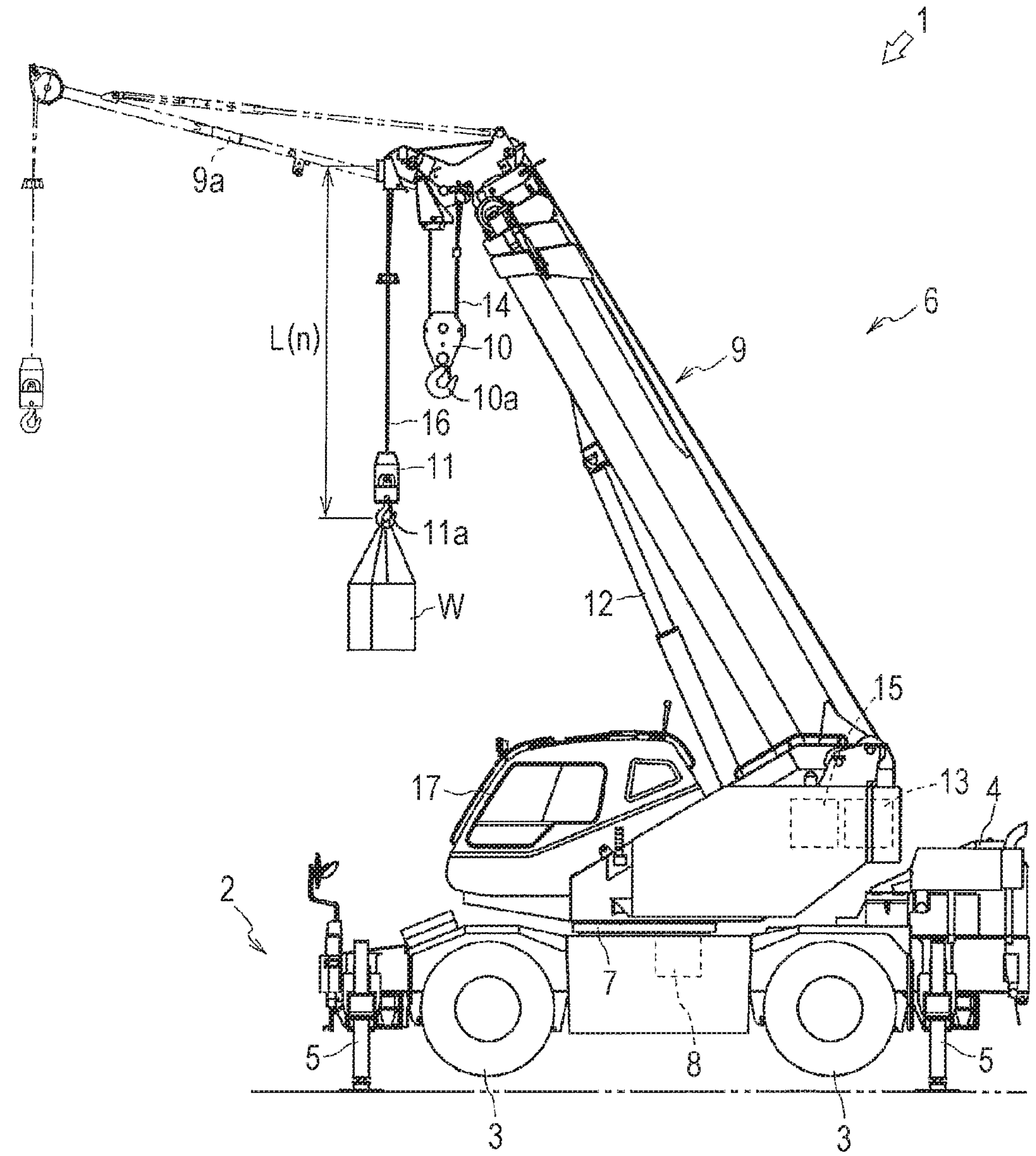
FIG. 1 is a side view illustrating the overall configuration of a crane.

As illustrated in FIG. 1, the crane 1 is a mobile crane that can move to an unspecified place. The crane 1 includes a vehicle 2 and a crane device 6.

The vehicle 2 carries the crane device 6. The vehicle 2 includes a plurality of wheels 3 and runs with an engine 4 as a power source. The vehicle 2 includes an outrigger 5. The outrigger 5 has an overhanging beam and a jack cylinder. The overhanging beam can be extended and contracted in the width direction of the vehicle 2 by hydraulic pressure.

The jack cylinder is fixed to the tip of the overhanging beam and can extend and contract in a direction perpendicular to the ground. The vehicle 2 can extend the working range of the crane 1 by extending and contracting the outrigger 5 in the width direction of the vehicle 2 and grounding the jack cylinder.

The crane device 6 lifts a luggage W with a wire rope. The crane device 6 includes a swivel base 7, a boom 9, a jib 9*a*, a main hook block 10, a sub hook block 11, a derricking hydraulic cylinder 12, a main winch 13, a main wire rope 14, a sub winch 15, a sub wire rope 16, a cabin 17 and the like.

The swivel base 7 supports the crane device 6 to swivel with respect to the vehicle 2. The swivel base 7 is provided on the frame of the vehicle 2 via an annular bearing. The swivel base 7 rotates about the center of the annular bearing. The swivel base 7 is provided with a swiveling hydraulic motor 8.

The swivel base 7 swivels in a first direction or a second direction by the swiveling hydraulic motor 8. The hydraulic motor and the hydraulic cylinder that drive the boom 9 correspond to an example of an actuator. Specifically, the swiveling hydraulic motor 8 corresponds to an example of the actuator.

Further, the actuator may be regarded as including a drive part that drives the operable function part and a drive control part that controls the operation of the drive part. Examples of the drive part include a hydraulic motor and a hydraulic cylinder that drive the boom 9. Examples of the drive control part include valves that control the operations of these hydraulic motor and hydraulic cylinder. Specifically, a swivel actuator that swivels the boom 9 includes the swiveling hydraulic motor 8 and a swivel valve 23.

The swiveling hydraulic motor 8 is rotated by the swivel valve 23 (see FIG. 2) which is an electromagnetic proportional switching valve. The swivel valve 23 can control the flow quantity of the hydraulic oil supplied to the swiveling hydraulic motor 8 to be an arbitrary flow quantity.

That is, the swivel base 7 is controlled to be an arbitrary swivel speed via the swiveling hydraulic motor 8 which is rotationally operated by the swivel valve 23. The swivel base 7 includes a swivel sensor 27 (see FIG. 2) that detects the swivel position (swivel angle) and swivel speed of the swivel base 7.

It may be considered that the swivel sensor 27 detects information regarding the swivel angle of the boom 9. The information regarding the swivel angle of the boom 9 detected by the swivel sensor 27 corresponds to the information regarding the present position of the boom 9 and a first movement quantity. Further, the swivel sensor 27 may detect information regarding the operation quantity (total number of rotations) of the swiveling hydraulic motor 8 corresponding to the swivel angle of the boom 9 as information regarding the present position.

The boom 9 supports the wire rope so that the luggage W can be lifted. The boom 9 is configured by a plurality of boom members. The boom 9 is supported so as to be extendable and contractible in the axial direction by moving each boom member by a telescopic hydraulic cylinder (not illustrated). The base end of the base boom member of the boom 9 is supported at the approximate center of the swivel base 7 to freely swing.

A telescopic hydraulic cylinder (not illustrated) is telescopically operated by a telescopic valve 24 (see FIG. 2) which is an electromagnetic proportional switching valve. The telescopic valve 24 controls the flow quantity of the hydraulic oil supplied to the telescopic hydraulic cylinder (not illustrated) to be an arbitrary flow quantity. That is, the boom 9 is controlled to have an arbitrary boom length by the telescopic valve 24.

Figure 2:
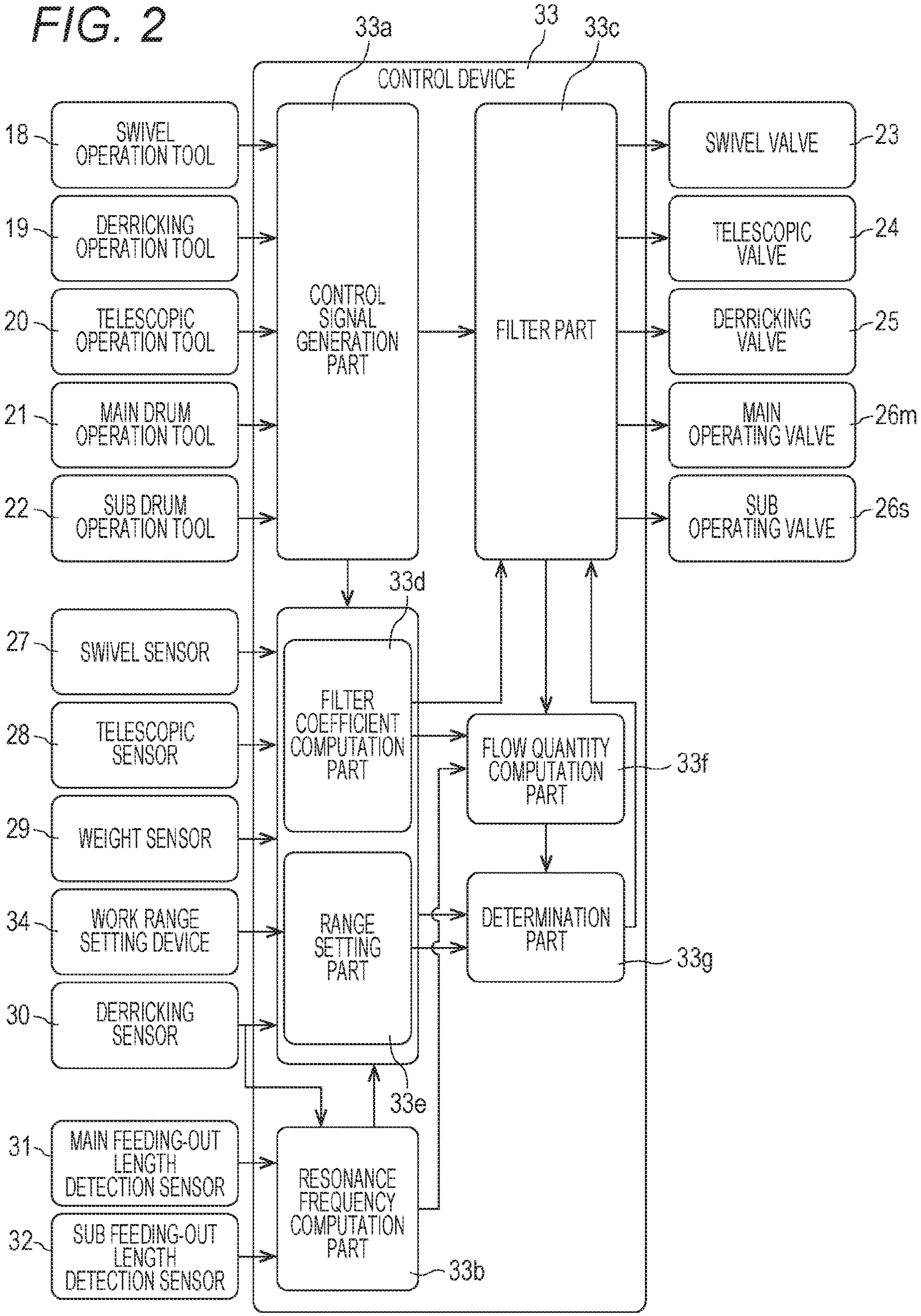
FIG. 2 is a block diagram illustrating a control configuration of the crane.

The boom 9 includes a telescopic sensor 28 and a weight sensor 29 (see FIG. 2). The telescopic sensor 28 detects information regarding the length of the boom 9. The weight sensor 29 detects information regarding the weight Wt of the luggage W.

The jib 9*a* is for extending the lift and working radius of the crane device 6. The jib 9*a* is held in a posture along the base boom member by a jib support part provided on the base boom member of the boom 9. The base end of the jib 9*a* is connectable to the jib support part of a top boom member.

The main hook block 10 and the sub hook block 11 are suspenders for hanging the luggage W. The main hook block 10 is provided with a plurality of hook sheaves around which the main wire rope 14 is wound, and a main hook 10*a* for hanging the luggage W. The sub hook block 11 is provided with a sub hook 11*a* for hanging the luggage W.

The derricking hydraulic cylinder 12 raises and lowers the boom 9 to hold the posture of the boom 9. The derricking hydraulic cylinder 12 includes a cylinder portion and a rod portion. The end portion of the cylinder portion is connected to the swivel base 7 to freely swing. The end portion of the rod portion is connected to the base boom member of the boom 9 to freely swing.

The derricking hydraulic cylinder 12 is extended and contracted by a derricking valve 25 (see FIG. 2) which is an electromagnetic proportional switching valve. The derricking valve 25 can control the flow quantity of the hydraulic oil supplied to the derricking hydraulic cylinder 12 to be an arbitrary flow quantity. That is, the boom 9 is controlled to be an arbitrary derricking speed by the derricking valve 25. The boom 9 is provided with a derricking sensor 30 (see FIG. 2) that detects information regarding a derricking angle.

The main winch 13 and the sub winch 15 feed out (roll up) and feed in (roll down) the main wire rope 14 and the sub wire rope 16. The main winch 13 includes a main drum around which the main wire rope 14 is wound, and a main hydraulic motor (not illustrated) that is an actuator that rotationally drives the main drum.

The sub winch 15 includes a sub drum around which the sub wire rope 16 is wound, and a sub hydraulic motor that is an actuator that rotationally drives the sub drum.

The main hydraulic motor is rotationally operated by a main operating valve 26*m* (see FIG. 2 which is an electromagnetic proportional switching valve. The main operating valve 26*m* controls the flow quantity of the hydraulic oil supplied to the main hydraulic motor to be an arbitrary flow quantity.

That is, the main winch 13 is controlled to be an arbitrary feeding-in speed or feeding-out speed by the main operating valve 26*m*. Similarly, the sub winch 15 is controlled to be an arbitrary feeding-in speed or feeding-out speed by a sub operating valve 26*s* (see FIG. 2) which is an electromagnetic proportional switching valve.

The main winch 13 is provided with a main feeding-out length detection sensor 31. Similarly, the sub winch 15 is provided with a sub feeding-out length detection sensor 32.

The main feeding-out length detection sensor 31 detects information regarding a feeding-out quantity Lma(n) of the main wire rope 14 fed out from the main winch 13. The information regarding the feeding-out quantity Lma(n) detected by the main feeding-out length detection sensor 31 may be regarded as the information regarding the length of the main wire rope 14 fed out from the main winch 13.

The sub feeding-out length detection sensor 32 detects information regarding the feeding-out quantity Lsa(n) of the sub wire rope 16 fed out from the sub winch 15. The information regarding the feeding-out quantity Lsa(n) detected by the sub feeding-out length detection sensor 32 may be regarded as the information regarding the length of the sub wire rope 16 fed out from the sub winch 15.

The cabin 17 covers the cockpit. The cabin 17 is mounted on the swivel base 7. The cabin 17 includes the cockpit (not illustrated). An operation tool for operating the vehicle 2 and an operation tool for operating the crane device 6 are provided in the cockpit.

The operation tools for operating the crane device 6 are, for example, a swivel operation tool 18, a derricking operation tool 19, a telescopic operation tool 20, a main drum operation tool 21, and a sub drum operation tool 22. The cabin 17 may be provided with a work range setting device 34 and the like (see FIG. 2).

The swivel operation tool 18 controls the swiveling hydraulic motor 8 by operating the swivel valve 23. The derricking operation tool 19 controls the derricking hydraulic cylinder 12 by operating the derricking valve 25. The telescopic operation tool 20 controls a telescopic hydraulic cylinder (not illustrated) by operating the telescopic valve 24.

The main drum operation tool 21 controls the main hydraulic motor by operating the main operating valve 26*m*. The sub drum operation tool 22 controls the sub hydraulic motor by operating the sub operating valve 26*s*.

The work range setting device 34 is used when arbitrarily setting a regulation range (also referred to as an operation limitation range) of the operable function part (for example, the boom 9). The work range setting device 34 may be used when setting the regulation range of the operable function part (for example, the boom 9) based on the input of the operator.

The work range setting device 34 may set the regulation range of the boom 9 based on the input of the operator. The work range setting device 34 may be regarded as an example of a regulation range setting part.

The work range setting device 34 may set the regulation range based on the detection values (also referred to as information regarding the work state) of various sensors (for example, the swivel sensor 27, the telescopic sensor 28, the weight sensor 29, etc.) provided in the crane 1 and/or various types of information stored in a safety device (not illustrated) of the crane 1.

The work range setting device 34 may set the regulation range of the operable function part (for example, the boom 9) based on the positional relationship with surrounding obstacles or other cranes 1 (also referred to as surrounding information). In this case, the regulation range may be regarded as a range in which the operable function part (for example, the boom 9) may collide with the surrounding obstacles or other cranes 1 or the like when entering the regulation range.

Further, the regulation range may be regarded as, for example, a range in which the boom is prohibited from entering. Further, the regulation range may be a range in which the hook is prohibited from entering.

The crane 1 thus configured can move the crane device 6 to an arbitrary position by causing the vehicle 2 to travel. Further, the crane 1 adjusts the derricking angle of the boom 9 by operating the derricking operation tool 19, and adjusts the length of the boom 9 by manipulating the telescopic operation tool 20, so that the lift and working radius of the crane device 6 can be adjusted. In addition, the crane 1 conveys the luggage W by rotating the swivel base 7 with the luggage W being lifted.

As illustrated in FIG. 2, a control device 33 controls the actuator of the crane 1 via the operation valves 23 to 25, 26*m*, and 26*s*. It can be considered that the operation valves 23 to 25, 26*m*, and 26*s* form a part of the actuator. The control device 33 includes a control signal generation part 33*a*, a resonance frequency computation part 33*b*, a filter part 33*c*, a filter coefficient computation part 33*d*, a flow quantity computation part 33*f*, a range setting part 33*e*, and a determination part 33*g*.

The control device 33 is provided in the cabin 17. The control device 33 may actually have a configuration in which a CPU, a RUM, a RAM, an HDD, and the like are connected by a bus. Further, the control device 33 may be configured by a one-chip LSI or the like.

The control device 33 may store various programs and data in a storage part (not illustrated) to control the operations of the control signal generation part 33*a*, the resonance frequency computation part 33*b*, the filter part 33*c*, the filter coefficient computation part 33*d*, the flow quantity computation part 33*f*, the range setting part 33*e*, and the determination part 33*g*.

The control signal generation part 33*a* is a part of the control device 33, and generates a basic control signal that is a speed command for each actuator. The control signal generation part 33*a* acquires the operation quantity (also referred to as operation-related information) of each operation tool from the swivel operation tool 18, the derricking operation tool 19, the telescopic operation tool 20, the main drum operation tool 21, and/or the sub drum operation tool 22.

The basic control signal may be regarded as a control signal that has not been filtered by a notch filter F(n) described below. The control signal generation part 33*a* corresponds to an example of a generation part. The basic control signal corresponds to an example of a first control signal.

The control signal generation part 33*a* may acquire information regarding the state of the crane 1 such as a swivel position of the swivel base 7, a boom length, a derricking angle and/or weights Wm and Ws of the luggage W from the swivel sensor 27, the telescopic sensor 28, a derricking sensor (not illustrated), and/or the weight sensor 29.

The control signal generation part 33*a* generates a basic control signal C(1) of the swivel operation tool 18 based on the acquired information regarding the operation of the crane 1. In addition, the control signal generation part 33*a* generates the basic control signals C(2) to (5) of the operation tools 19 to 22 based on the acquired information regarding the operation of the crane 1 and/or the acquired information regarding the state of the crane 1. Hereinafter, the basic control signals C(1) to C(5) will be simply referred to as a basic control signal C(n). Further, n may be regarded as the number of operation tools controlled by the basic control signal generated by the control signal generation part 33*a*.

Further, when the boom 9 is close to the regulation range or when a specific command is acquired, the control signal generation part 33*a* may generate an automatic stop signal C(na) to perform automatic control that does not depend on the operation (manual control) of the operation tool (for example, automatic stop or automatic conveyance) or an emergency stop signal C(ne) to perform emergency stop control based on the emergency stop operation of any operation tool.

The automatic stop signal C(na) and the emergency stop signal C(ne) may be regarded as control signals that are not filtered by the notch filter described later. The automatic stop signal C(na) and the emergency stop signal C(ne) may be regarded as control signals filtered by a notch filter described later.

The resonance frequency computation part 33*b* is a part of the control device 33, and calculates a resonance frequency ω(n) of the luggage W suspended on the main wire rope 14 or the sub wire rope 16 as a single pendulum. The resonance frequency computation part 33*b* corresponds to an example of a computation part.

The resonance frequency computation part 33*b* may calculate the resonance frequency ω(n) of the swing of the main hook 10*a* by using the main hook 10*a* suspended on the main wire rope 14 as a single pendulum. Further, the resonance frequency computation part 33*b* may calculate the resonance frequency ω(n) of the swing of the sub hook 11*a* by using the sub hook 11*a* suspended on the sub wire rope 16 as a single pendulum. It may be considered that the resonance frequency computation part 33*b* acquires the information necessary for calculating the resonance frequency ω(n) from each element forming the control device 33.

The resonance frequency computation part 33*b* may acquire the derricking angle of the boom 9 from the control signal generation part 33*a*. The resonance frequency computation part 33*b* may acquire information regarding the feeding-out quantity Lma(n) of the main wire rope 14 from the main feeding-out length detection sensor 31.

In addition, the resonance frequency computation part 33*b* may acquire information regarding the feeding-out quantity Lsa(n) of the sub wire rope 16 from the sub feeding-out length detection sensor 32. Further, when the main hook block 10 is used, the resonance frequency computation part 33*b* may acquire the multiplication factor of the main hook block 10 from a safety device (not illustrated).

Further, the resonance frequency computation part 33*b* may calculate a wire length Lm(n) in the vertical direction of the main wire rope 14 from the position where the main wire rope 14 is separated from the hook sheave (also referred to as the main hook sheave) to the main hook block 10.

The resonance frequency computation part 33*b* may calculate the wire length Lm(n) in the vertical direction based on the information regarding the feeding-out quantity Lma (n) acquired from the main feeding-out length detection sensor 31. Specifically, the wire length Lm(n) in the vertical direction may be regarded as a value obtained by dividing the feeding-out quantity Lma(n) by the number of wires applied to the main hook block 10 (two wires in the case of this embodiment).

The wire length Lm(n) in the vertical direction may be regarded as the length of the main wire rope 14 equal to the distance between the main hook sheave and the main hook block 10 in the vertical direction.

Further, the resonance frequency computation part 33*b* may calculate the wire length Ls(n) in the vertical direction of the sub wire rope 16 from the position where the sub wire rope 16 is separated from the hook sheave (also referred to as the sub hook sheave) to the sub hook block 11.

The resonance frequency computation part 33*b* may calculate the wire length Ls(n) in the vertical direction based on the information regarding the feeding-out quantity Lsa(n) acquired from the sub feeding-out length detection sensor 32. In the case of this embodiment, since the number of wires applied to the sub hook block is one, the wire length Ls(n) in the vertical direction is equal to the feeding-out quantity Lsa(n).

The wire length Ls(n) in the vertical direction may be regarded as the length of the sub wire rope 16 equal to the distance between the sub hook sheave and the sub hook block 11 in the vertical direction. Further, the wire length Ls(n) in the vertical direction of the sub wire rope 16 may be regarded to correspond to L(n) in FIG. 1.

Further, the resonance frequency computation part 33*b* may calculate the resonance frequency ω(n) for the main wire rope 14. Further, the resonance frequency computation part 33*b* may calculate the resonance frequency ω(n) for the sub wire rope 16. The resonance frequency ω(n) can be calculated from the following Expression (1) based on a gravitational acceleration g and a wire length L(n) in the vertical direction of the wire rope.

$$\omega(n)=\sqrt{(g/L(n))} \quad (1)$$

When calculating the resonance frequency ω(n) for the main wire rope 14, L(n) in the above Expression (1) is the wire length Lm(n) in the vertical direction of the main wire rope 14.

When calculating the resonance frequency ω(n) for the sub wire rope 16, L(n) in the above Expression (1) is the wire length Ls(n) in the vertical direction of the sub wire rope 16.

The resonance frequency ω(n) may be calculated using the pendulum length (the length from the position where the main wire rope 14 is separated from the sheave to the center of gravity G of the luggage W in the wire rope) in place of the suspension length L(n).

The filter part 33*c* is a part of the control device 33, and generates notch filters F(1), F(2), . . . , F(n) that attenuate a specific frequency region of the basic control signals C(1), C(2), . . . , C(n) (hereinafter, simply referred to as "notch filter F(n)", and n is an arbitrary number). The filter part 33*c* generates a filtering control signal Cd(n) by filtering the basic control signal C(n) with the generated notch filter F(n).

The filter coefficient computation part 33*d* acquires information regarding the swivel position of the swivel base 7, information regarding the boom length, information regarding the derricking angle, information regarding the weights Wm and Ws of the luggage W, and the basic control signal C(n) from the control signal generation part 33*a*. Further, the filter part 33*c* acquires the resonance frequency ω(n) calculated by the resonance frequency computation part 33*b*.

The filter coefficient computation part 33*d* calculates a center frequency coefficient ωn, a notch width coefficient ζ, and a notch depth coefficient δ of a transfer function H(s) (see Expression (2) described later) of the notch filter F(n) based on information regarding the operation state of the crane 1 such as information regarding the acquired swivel position of the swivel base 7, information regarding the boom length, information regarding the derricking angle, and information regarding the weights Wm and Ws of the luggage W.

The filter coefficient computation part 33*d* calculates the notch width coefficient ζ and the notch depth coefficient δ corresponding to each of the basic control signals C(n). The filter coefficient computation part 33*d* calculates the corresponding center frequency coefficient ωn using the acquired resonance frequency ω(n) as a center frequency ωc(n).

In this embodiment, the filter part 33*c* calculates the center frequency coefficient ωn, the notch width coefficient ζ, and the notch depth coefficient δ acquired from the filter coefficient computation part 33*d*, and applies the coefficients to the transfer function H(s). The filter part 33*c* and the filter coefficient computation part 33*d* illustrated in FIG. 2 may be regarded as an example of the filter part.

The filter part 33*c* generate a filtering control signal Cd(1) obtained by applying the notch filter F(1) to the basic control signal C(1) to attenuate the frequency component in an arbitrary frequency range with the resonance frequency ω(1) as a reference from the basic control signal C(1) at an arbitrary rate.

Similarly, the filter part 33*c* applies the notch filter F(2) to the basic control signal C(2) to generate a filtering control signal Cd(2). That is, the filter part 33*c* generates a filtering control signal Cd(n) obtained by applying the notch filter F(n) to the basic control signal C(n) (hereinafter, simply referred to as "filtering control signal Cd(n)", and n is an arbitrary number) to attenuate a frequency component in an arbitrary frequency range with the resonance frequency ω(n) as a reference from the basic control signal C(n) at an arbitrary rate. The filtering control signal Cd(n) generated by the filter part 33*c* corresponds to an example of the second control signal.

Further, the filter part 33*c* may start the automatic stop control based on the signal from the determination part 33*g*. The filter part 33*c* transmits the filtering control signal Cd(n) to the corresponding operation valve among the swivel valve 23, the telescopic valve 24, the derricking valve 25, the main operating valve 26*m*, and the sub operating valve 26*s*.

That is, the control device 33 controls the swiveling hydraulic motor 8 which is an actuator, the derricking hydraulic cylinder 12, a telescopic hydraulic cylinder (not illustrated), a main hydraulic motor (not illustrated), and a sub hydraulic motor (not illustrated) via the respective operation valves 23 to 25, 26*m*, and 26*s*.

The range setting part 33*e* is a part of the control device 33. The range setting part 33*e* may calculate the operable range of the operable function part (for example, the boom 9, the main hook 10*a*, and the sub hook 11*a*) based on the regulation range of the operable function part (for example, the boom 9, the main hook 10*a*, and the sub hook 11*a*) set by the work range setting device 34.

The operable range may include an operable range regarding extension/contraction of the boom 9, an operable range regarding the derricking of the boom 9, and an operable range regarding the swiveling of the boom 9. The operable range may include an operable range regarding the movement (vertical movement) of the main hook 10*a* and the sub hook 11*a*.

The range setting part 33*e* may set an allowance operation quantity that is an operable range where the operable function part (for example, the boom 9, the main hook 10*a*, and sub hook 11*a*) based on the regulation range of the operable function part (for example, the boom 9, the main hook 10*a*, and the sub hook 11*a*) set by the work range setting device 34.

When the operable function part is the boom 9, the allowance operation quantity may include the allowance operation quantity regarding the extension and contraction of the boom 9, the allowance operation quantity regarding the derricking of the boom 9, and the allowance operation quantity regarding the swiveling of the boom 9 so that the boom 9 does riot enter the regulation range.

The flow quantity computation part 33*f* is a part of the control device 33. In the control based on the filtering control signal Cd(n), the flow quantity computation part 33*f* calculates a flow quantity Δφ in which the operable function part (for example, the boom 9) moves until the operation (for example, swiveling) of the operable function part (for example, the boom 9) driven by this actuator stops after the stop signal is input to the actuator. The flow quantity computation part 33*f* corresponds to an example of a computation part.

When the operable function part is the boom 9, the flow quantity Δφ may be a flow quantity Δφ (also referred to as a flow angle or a swivel flow quantity) regarding the swiveling of the boom 9. Further, when the operable function part is the boom 9, the flow quantity Δφ may be a flow quantity Δφ (also referred to as an extension/contraction flow quantity) related to the extension/contraction of the boom 9. When the operable function part is the boom 9, the flow quantity Δφ may be a flow quantity Δφ related to the derricking of the boom 9 (also referred to as a derricking flow quantity).

In the control based on the filtering control signal Cd(n), the flow quantity computation part 33*f* constantly calculates an operating speed φ of the operable function part (for example, the boom 9) or the actuator that drives the operable function part, a load swing cycle T based on the resonance frequency ω(n), a load sway reduction rate Pnf based on the notch width coefficient ζ and the notch depth coefficient δ, and the flow quantity Δφ of the operable function part (for example, the boom 9) or the actuator, which drives the operable function part, based on a deceleration limit value Dcc.

In the control based on the filtering control signal Cd(n), the flow quantity computation part 33*f* may intermittently calculate the flow quantity Δφ at predetermined intervals. The flow quantity Δφ changes according to the swivel speed of the boom 9, for example.

The load sway reduction rate Pnf is a rate determined by the notch width coefficient ζ and the notch depth coefficient δ in the transfer function H(s) of the notch filter F(n).

The deceleration limit value Dcc is the lower limit value of the deceleration (speed decrease quantity per part time) in the filtering control signal Cd(n).

Further, when the filtering control signal Cd(n) is not generated, that is, when the notch filter F(n) is not applied to the basic control signal C(n), the flow quantity computation part 33*f* may calculate the flow quantity of the operable function part (for example, the boom 9) until the operable function part (for example, the boom 9) stops after each operation stop signal is input in the control based on the basic control signal C(n).

The determination part 33*g* is a part of the control device 33. The determination part 33*g* determines whether to apply the automatic stop control in order to stop the operable function part (for example, the boom 9) within the regulation range.

In a case where the difference between the current operation quantity (for example, the swivel angle from the reference position) of the operable function part (for example, the boom 9) determined from the operation state of the crane 1 and a target operation quantity is equal to or less than the flow quantity Δφ (for example, the flow angle), the determination part 33*g* transmits a start signal of the automatic stop control to the filter part 33*c*.

The target operation quantity may be regarded as an operation quantity (swivel angle) until the operable function part operates (for example, turns) from the reference position and reaches the boundary of the regulation range. The target operation quantity may be regarded as an example of information regarding the target stop position. The current operation quantity may be regarded to correspond to an example of information regarding the present position.

The notch filter F(n) will be described with reference to FIGS. 3 and 4. The notch filter F(n) is a filter that gives a sharp attenuation to the basic control signal C(n) with an arbitrary frequency as a center.

Figure 3:
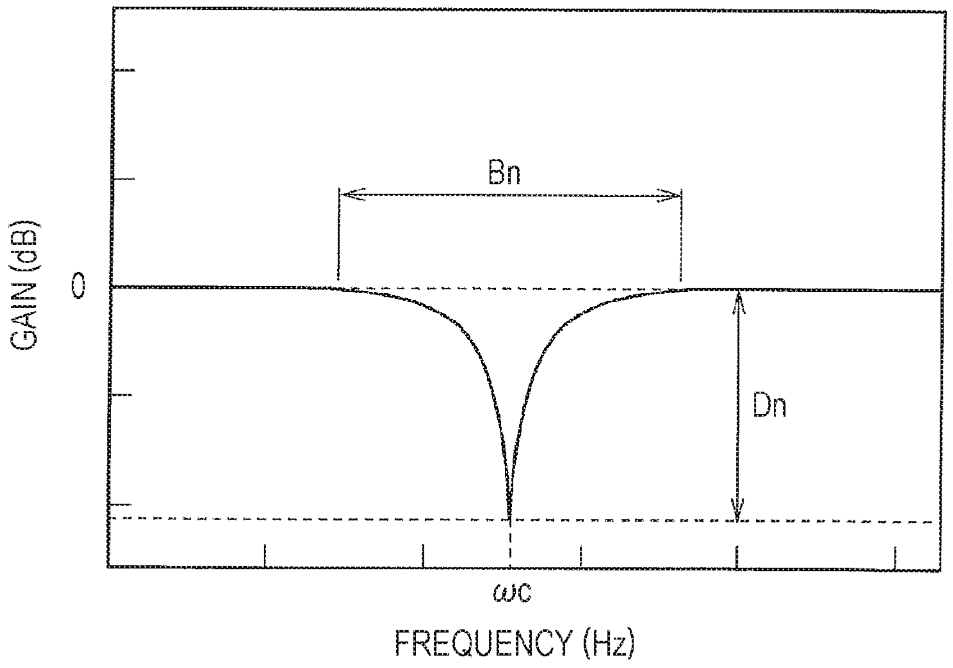
FIG. 3 is a graph illustrating frequency characteristics of a notch filter.
Figure 4:
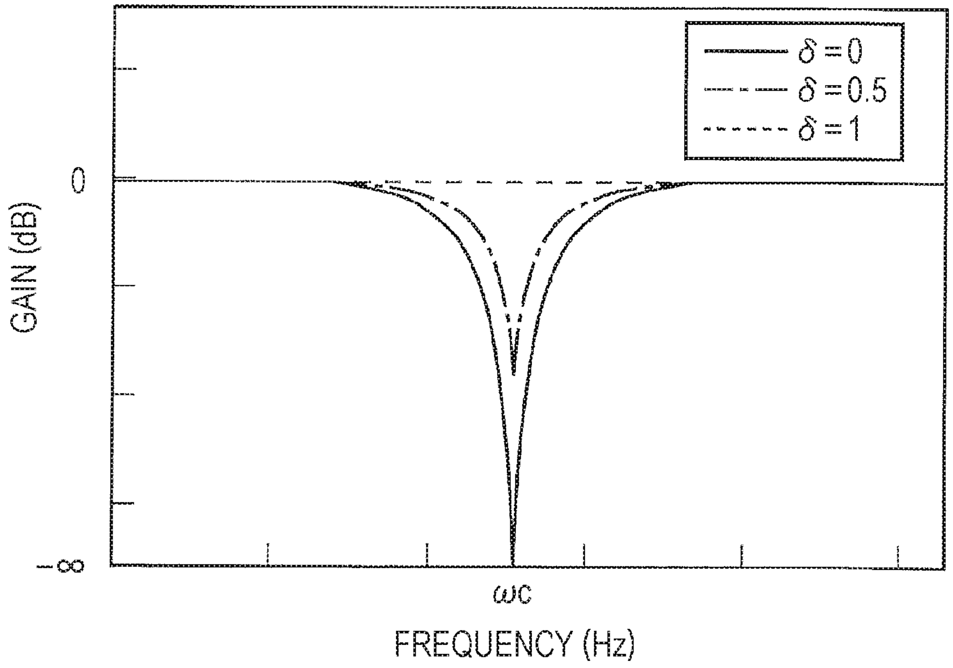
FIG. 4 is a graph illustrating frequency characteristics when notch depth coefficients are different in a notch filter.

As illustrated in FIG. 3, the notch filter F(n) is a filter with a frequency characteristic in which the frequency component of a notch width Bn, which is an arbitrary frequency range centered on an arbitrary center frequency ωc(n), is attenuated at a notch depth Dn which is an attenuation rate at an arbitrary frequency in the center frequency ωc(n)).

That is, the frequency characteristic of the notch filter F(n) is set from the center frequency ωc(n), the notch width Bn, and the notch depth Dn. The notch filter F(n) has a transfer function H(s) illustrated in the following Expression (2).

[Math. 1]

$$H(s) = \frac{s^2 + 2\delta\zeta\omega_n s + \omega_n^2}{s^2 + 2\zeta\omega_n s + \omega_n^2} \quad (2)$$

In the above Expression (2), ωn is the center frequency coefficient ωn corresponding to the center frequency ωc(n) of the notch filter F(n). ζ is the notch width coefficient ζ corresponding to the notch width Bn. δ is the notch depth coefficient δ corresponding to the notch depth Dn.

In the notch filter F(n), the center frequency ωc(n) of the notch filter F(n) is changed by changing the center frequency coefficient ωn. In the notch filter F(n), the notch width Bn of the notch filter F(n) is changed by changing the notch width coefficient ζ.

In the notch filter F(n), the notch depth Dn of the notch filter F(n) is changed by changing the notch depth coefficient δ. The characteristic of the notch filter F(n) is represented by the load sway reduction rate Pnf determined by the notch width coefficient ζ and the notch depth coefficient δ.

In the notch filter F(n), the notch width Bn increases as the notch width coefficient ζ increases. In other words, in the notch filter F(n), the frequency range to be attenuated (that is, the notch width Bn) is set corresponding to the notch width coefficient ζ.

The notch depth coefficient δ is set between 0 and 1. As illustrated in FIG. 4, when the notch depth coefficient δ=0, the gain characteristic at the center frequency ωc(n) of the notch filter F(n) is −∞ dB. This maximizes the quantity of attenuation at the center frequency ωc(n). That is, the notch filter F(n) outputs an output signal (filtering control signal) obtained by attenuating the frequency component corresponding to the frequency characteristic of the notch filter F(n) from the frequency component included in the input signal (basic control signal).

When the notch depth coefficient δ=1, the gain characteristic at the center frequency ωc(n)) of the notch filter F(n) is 0 dB. Such a notch filter F(n) does not have a function of attenuating the frequency component included in the input signal (basic control signal). That is, the notch filter F(n) outputs the input signal (basic control signal) as an output signal.

As illustrated in FIG. 2, the control signal generation part 33*a* of the control device 33 is connected to the swivel operation tool 18, the derricking operation tool 19, the telescopic operation tool 20, the main drum operation tool 21, and the sub drum operation tool 22.

The control signal generation part 33*a* generates the control signal C(n) according to the operation quantity (operation signal) of each of the swivel operation tool 18, the derricking operation tool 19, the main drum operation tool 21, and the sub drum operation tool 22.

The resonance frequency computation part 33*b* of the control device 33 is connected to the derricking sensor 30, the main feeding-out length detection sensor 31, the sub feeding-out length detection sensor 32, the filter coefficient computation part 33*d*, and a safety device (not illustrated). The resonance frequency computation part 33*b* calculates the wire length Lm(n) of the main wire rope 14 in the vertical direction and the wire length Ls(n) of the sub wire rope 16 in the vertical direction.

The filter part 33*c* of the control device 33 is connected to the control signal generation part 33*a*. The filter part 33*c* acquires the control signal C(n) from the control signal generation part 33*a*.

The filter part 33*c* is connected to the filter coefficient computation part 33*d*. The filter part 33*c* acquires the notch width coefficient ζ, the notch depth coefficient δ, and the center frequency coefficient ωn from the filter coefficient computation part 33*d*.

The filter part 33*c* is also connected to the determination part 33*g*. The filter part 33*c* can acquire the start signal of the automatic stop control from the determination part 33*g*.

The filter coefficient computation part 33*d* of the control device 33 is connected to the control signal generation part 33*a*. The filter coefficient computation part 33*d* acquires the control signal C(n) from the control signal generation part 33*a*.

The filter coefficient computation part 33*d* is connected to the resonance frequency computation part 33*b*. The filter coefficient computation part 33*d* acquires the length Lm(n) of the main wire rope 14 in the vertical direction, the length Ls(n) of the sub wire rope 16 in the vertical direction (see L(n) in FIG. 1), and the resonance frequency ω(n) from the resonance frequency computation part 33*b*.

The filter coefficient computation part 33*d* is connected to the swivel sensor 27, the telescopic sensor 28, the weight sensor 29, and the derricking sensor 30. The filter coefficient computation part 33*d* acquires information regarding the swivel angle of the boom 9 and/or information regarding the swivel position of the swivel base 7 from the swivel sensor 27.

The filter coefficient computation part 33*d* acquires information regarding the boom length from the telescopic sensor 28. The filter coefficient computation part 33*d* acquires information regarding the derricking angle from the derricking sensor 30. The filter coefficient computation part 33*d* acquires information regarding the weight Wt of the luggage W from the weight sensor 29.

The range setting part 33*e* of the control device 33 is connected to the swivel sensor 27, the telescopic sensor 28, the weight sensor 29, and the derricking sensor 30. The range setting part 33*e* acquires information regarding the swivel angle of the boom 9 and/or information regarding the swivel position of the swivel base 7 from the swivel sensor 27.

The range setting part 33*e* acquires information regarding the boom length from the telescopic sensor 28. The range setting part 33*e* acquires information regarding the derricking angle from the derricking sensor 30. The range setting part 33*e* acquires information regarding the weight Wt of the luggage W from the weight sensor 29.

The range setting part 33*e* is connected to the work range setting device 34. The range setting part 33*e* acquires information regarding the regulation range of the boom 9 from the work range setting device 34. The range setting part 33*e* sets the operable range of the boom 9 based on the acquired information regarding the regulation range.

The flow quantity computation part 33*f* of the control device 33 is connected to the resonance frequency computation part 33*b*. The flow quantity computation part 33*f* acquires the resonance frequency ω(n) from the resonance frequency computation part 33*b*.

Further, the flow quantity computation part 33*f* is connected to the filter part 33*c*. The flow quantity computation part 33*f* acquires the filtering control signal Cd(n) from the filter part 33*c*.

The flow quantity computation part 33*f* is connected to the filter coefficient computation part 33*d*. The flow quantity computation part 33*f* acquires the notch width coefficient ζ and the notch depth coefficient δ from the filter coefficient computation part 33*d*.

The determination part 33*g* of the control device 33 is connected to the swivel sensor 27, the telescopic sensor 28, the weight sensor 29, and the derricking sensor 30. The determination part 33*g* acquires information regarding the swivel angle of the boom 9 and/or information regarding the swivel position of the swivel base 7 from the swivel sensor 27.

The determination part 33*g* acquires information regarding the boom length from the telescopic sensor 28. The determination part 33*g* also acquires information regarding the derricking angle from the derricking sensor 30. Further, the determination part 33*g* acquires information regarding the weight Wt of the luggage W from the weight sensor 29.

The determination part 33*g* is also connected to the range setting part 33*e*. The determination part 33*g* acquires information regarding the operable range of the boom 9 from the range setting part 33*e*. The determination part 33*g* is also connected to the flow quantity computation part 331. The determination part 33*g* acquires the information regarding the flow quantity from the flow quantity computation part 33*f*.

The swivel valve 23, the telescopic valve 24, the derricking valve 25, the main operating valve 26*m*, and the sub operating valve 26*s* are each connected to the filter part 33*c*. The swivel valve 23, the telescopic valve 24, the derricking valve 25, the main operating valve 26*m*, and the sub operating valve 26*s* acquire the corresponding filtering control signal Cd(n) and the corresponding automatic stop signal C(na) from the filter part 33*c*.

The control device 33 generates the control signal C(n) corresponding to each operation tool based on the operation quantities of the swivel operation tool 18, the derricking operation tool 19, the telescopic operation tool 20, the main drum operation tool 21, and the sub drum operation tool 22 in the control signal generation part 33*a*.

Further, in the resonance frequency computation part 33*b*, the control device 33 calculates the wire length Lm(n) of the main wire rope 14 in the vertical direction based on the feeding-out quantity Lma(n) of the main wire rope 14 acquired from the main feeding-out length detection sensor Further, in the resonance frequency computation part 33*b*, the control device 33 calculates the wire length Ls(n) of the sub wire rope 16 in the vertical direction based on the feeding-out quantity Lsa(n) of the sub wire rope 16 acquired from the sub feeding-out length detection sensor 32.

Further, the control device 33 calculates the notch width coefficient ζ and the notch depth coefficient δ corresponding to the control signal C(n) in the filter coefficient computation part 33*d* based on the control signal C(n), information regarding the swivel position of the swivel base 7, information regarding the boom length, information regarding the derricking angle, and information regarding the weight Wt of the luggage W.

Further, the filter coefficient computation part 33*d* calculates the center frequency coefficient ωn of the notch filter F(n) based on the resonance frequency ω(n) acquired from the resonance frequency computation part 33*b*.

Figure 5:
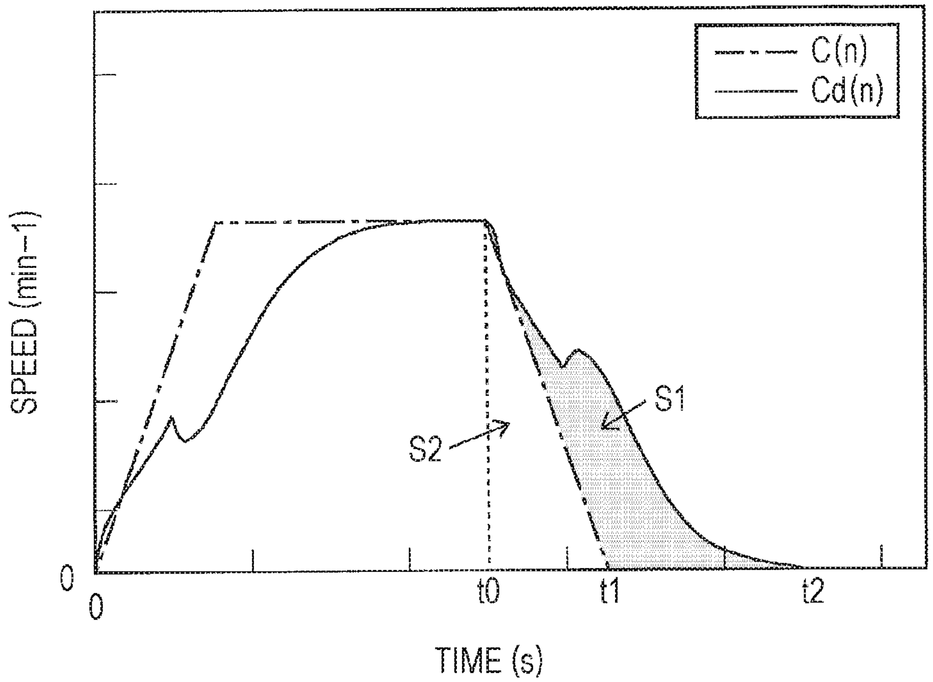
FIG. 5 is a graph illustrating a basic control signal and a filtering control signal for a swivel operation.

As illustrated in FIG. 5, the control device 33 filters the control signal C(n) using the notch filter F(n) to which the notch width coefficient ζ, the notch depth coefficient δ, and the center frequency coefficient ωn are applied in the filter part 33*c* to generate the filtering control signal Cd(n).

The filtering control signal Cd(n) (the control signal illustrated by the solid line in FIG. 5), which is the output signal of the notch filter F(n), is a control signal in which the component of the resonance frequency frequency ω(n) is attenuated from the basic control signal C(n) (the control signal illustrated by the dashed line in FIG. 5).

Therefore, the control based on the filtering control signal Cd(n) takes longer time until the operation of the operable function part stops after a stop command (also referred to as deceleration command) of the operation of the operable function part (for example, the boom 9) compared to the control based on the basic control signal C(n).

As an example, as illustrated in FIG. 5, in the control based on the basic control signal C(n), the operation of the boom 9 is stopped at time t1 after the stop command of the operation of the boom 9 is output at time t0. On the other hand, as illustrated in FIG. 5, in the control based on the filtering control signal Cd(n), the operation of the boom 9 stops at time t2 after the command of stopping the boom 9 is output at time t0. The control device 33 may output the stop command for the boom 9.

Specifically, the operation of the actuator is controlled based on the filtering control signal Cd(n) output from the notch filter F(n) with the notch depth coefficient δ close to 0 (the notch depth Dn is deep). However, the reaction is slow compared to a case where the operation is controlled by the filtering control signal Cd(n) output from the notch filter F(n) with the notch depth coefficient δ close to 1 (the notch depth Dn is shallow) or the basic control signal C(n).

Similarly, the operation of the actuator is controlled based on the filtering control signal Cd(n) output from the notch filter F(n) whose notch width coefficient ζ is relatively larger than the standard value (the notch width Bn is relatively wide). However, the reaction is slow compared to a case where the operation is controlled by the filtering control signal Cd(n) output from the notch filter F(n) whose notch width coefficient ζ is relatively smaller than the standard value (the notch width Bn is relatively narrow) or the basic control signal C(n).

Next, a swivel flow angle γ which is the flow quantity of the boom 9 will be described with reference to FIG. 6. The swivel flow angle γ of the boom 9 means the swivel angle of boom 9 from the output of the stop signal to the stop of the boom 9 when assuming that the stop signal when it is assumed that the control device 33 outputs the stop signal for stopping the swing of the boom 9 to the swiveling hydraulic motor 8 at the present position of the boom 9. The swivel flow angle γ corresponds to an example of information regarding the flow quantity and a first flow quantity.

The case where the control device 33 outputs the stop signal for stopping the swing of the boom 9 to the swiveling hydraulic motor 8 may be regarded as a case where the stop signal for stopping the swing of the boom 9 is input to the swiveling hydraulic motor 8.

The swivel angle of the boom 9 from the reference position (also referred to as a first reference position) has a predetermined relationship with the rotation speed of the swiveling hydraulic motor 8 from the reference position (also referred to as a second reference position). That is, the swivel angle of the boom 9 from the reference position is calculated based on the number of rotations of the swiveling hydraulic motor 8 from the reference position.

The operation quantity (total number of rotations) of the swiveling hydraulic motor 8 from the input of the stop signal to the stop of the boom 9 when assuming that the control device 33 outputs the stop signal for stopping the swing of the boom 9 to the swiveling hydraulic motor 8 corresponds to an example of information regarding the flow quantity.

In this embodiment, the swivel flow angle γ will be described using the rotation speed of the swiveling hydraulic motor 8, the current swivel speed φb of the boom 9 that is interlocked with the operation quantity, and a swivel angle β.

Further, in this embodiment, the information regarding the flow quantity is the swivel flow angle γ of the boom 9. The information regarding the present position is the swivel angle β of the boom 9 from the reference position (the first reference position). The information regarding the target stop position is a limit swivel angle α. The limit swivel angle α corresponds to an example of the limit movement quantity.

The information regarding the target stop position may be determined based on the boundary position between the operable range and the regulation range. Further, the information regarding the target stop position may be determined based on the information regarding the posture of the crane 1 and the information regarding the weight Wt of the luggage W.

In addition, the information regarding the target stop position may be determined based on the position information of the transport destination of the luggage W. The information regarding the target stop position may be an arbitrary position selected by the operator.

The information regarding the flow quantity, the information regarding the present position, and the information regarding the target stop position are not limited to the above cases.

When the boom 9 is derricking, the information regarding the flow quantity may be the derricking flow angle of the boom 9. When the boom 9 is derricking, the information regarding the present position may be the derricking angle of the boom 9 from the reference position (fully tilted state). When the boom 9 is in derricking, the information regarding the target stop position may be a limit derricking angle of the boom 9.

When the boom 9 is extending and contracting, the information regarding the flow quantity may be the extension/contraction flow quantity of the boom 9. When the boom 9 is extending and contracting, the information regarding the present position may be the extension quantity of the boom 9 from the reference position (fully contracted state). When the boom 9 is extending and contracting, the information regarding the target stop position may be a limit position at which the boom 9 can extend and contract.

In addition, when the main hook **10*a* is moving downward, the information regarding the flow quantity may be the feeding-out flow quantity of the main wire rope 14. When the main hook 10*a* is moving downward, the information regarding the present position may be the suspension length of the main wire rope 14. When the main hook 10*a*** is moving downward, the information regarding the target stop position may be the limit feeding-out length.

Further, when the main hook **10*a* is moving upward, the information regarding the flow quantity may be the feeding-in flow quantity of the main wire rope 14. When the main hook 10*a* is moving upward, the information regarding the present position may be the suspension length of the main wire rope 14. When the main hook 10*a* is moving upward, the information regarding the target stop position may be the limit feeding-in length of the main wire rope 14**.

Further, when the sub hook **11*a* is moving downward, the information regarding the flow quantity may be the feeding-out flow quantity of the sub wire rope 16. When the sub hook 11*a* is moving downward, the information regarding the present position may be the suspension length of the sub wire rope 16. When the sub hook 11*a* is moving downward, the information regarding the target stop position may be the limit feeding-out length of the sub wire rope 16**.

Further, when the sub hook **11*a* is moving upward, the information regarding the flow quantity may be the feeding-in flow quantity of the sub wire rope 16. When the sub hook 11*a* is moving upward, the information regarding the present position may be the suspension length of the sub wire rope 16. When the sub hook is moving upward, the information regarding the target stop position may be the limit feeding-in length of the sub wire rope 16**.

Further, when the boom 9 is swiveling, the information regarding the flow quantity may be the flow rotation speed of the swiveling hydraulic motor 8. When the boom 9 is swiveling, the information regarding the present position may be the operation quantity (total number of rotations) of the swiveling hydraulic motor 8 corresponding to the reference position of the boom 9 from the reference position. When the boom 9 is swiveling, the information regarding the target stop position may be the operation quantity (total number of rotations) of the swiveling hydraulic motor 8 corresponding to the swivel angle from the reference position.

Further, when the boom 9 is derricking, the information regarding the flow quantity may be the flow quantity in the extension/contraction direction (movement quantity in the extension/contraction direction) of the derricking hydraulic cylinder 12. When the boom 9 derricking, the information regarding the present position may be the operation quantity (movement quantity in the extension/contraction direction) of the derricking hydraulic cylinder 12 corresponding to the reference position (fully tilted state) of the boom 9 from the reference position. When the boom 9 is derricking, the information regarding the target stop position may be the operation quantity (movement quantity in the extension/contraction direction) of the derricking hydraulic cylinder 12 corresponding to the limit derricking angle from the reference position.

When the boom 9 is extending and contracting, the information regarding the flow quantity may be the flow quantity (movement, quantity in the extension and contraction direction) of the telescopic hydraulic cylinder (not illustrated) in the extension and contraction direction. When the boom 9 is extending and contracting, the information regarding the present position may be the extension quantity (movement quantity in the extension and contraction direction) of the telescopic hydraulic cylinder (not illustrated) corresponding to the reference position (fully contracted state) of the boom 9 from the reference position. When the boom 9 is extending and contracting, the information regarding the target stop position may be the extension and contraction quantity (movement quantity in the extension and contraction direction) of the telescopic hydraulic cylinder (not illustrated) corresponding to the limit position at which the boom 9 can extend and contract.

Further, when the main hook 10*a* is moving downward, the information regarding the flow quantity may be the flow rotation speed of the main hydraulic motor (not illustrated) in the first direction. When the main hook 10*a* is moving downward, the information regarding the present position may be the operation quantity (total rotation speed) in the first direction of the main hydraulic motor (not illustrated) corresponding to the suspension length of the main hook 10*a*. When the main hook 10*a* is moving downward, the information regarding the target stop position may be the operation quantity in the first direction (total rotation speed) of the main hydraulic motor (not illustrated) corresponding to the limit feeding-out length of the main wire rope 14.

Further, when the main hook 10*a* is moving upward, the information regarding the flow quantity may be the flow rotation speed of the main hydraulic motor (not illustrated) in the second direction. When the main hook 10*a* is moving upward, the information regarding the present position may be the operation quantity (total rotation speed) in the second direction of the main hydraulic motor (not illustrated) corresponding corresponding to the suspension length of the main hook 10*a*. When the main hook 10*a* is moving upward, the information regarding the target stop position may be the operation quantity (total rotation speed) in the second direction of the main hydraulic motor (not illustrated) corresponding to the limit feeding-in length of the main wire rope 14.

Further, when the sub hook 11*a* is moving downward, the information regarding the flow quantity may be the flow rotation speed of the sub hydraulic motor (not illustrated) in the first direction. When the sub hook 11*a* is moving downward, the information regarding the present position may be the operation quantity (total number of rotations) in the first direction of the sub hydraulic motor (not illustrated) corresponding to the suspension length of the sub wire rope 16. When the sub hook 11*a* is moving downward, the information regarding the target stop position may be the operation quantity (total number of rotations) of the sub hydraulic motor (not illustrated) in the first direction corresponding to the limit feeding-out length of the sub wire rope 16.

When the sub hook 11*a* is moving upward, the information regarding the flow quantity may be the flow rotation quantity of the sub hydraulic motor (not illustrated) in the second direction. When the sub hook 11*a* is moving upward, the information regarding the present position may be the operation quantity (total number of rotations) in the second direction of the sub hydraulic motor (not illustrated) corresponding to the suspension length of the sub wire rope 16. When the sub hook 11*a* is moving upward, the information regarding the target stop position may be the operation quantity (total number of rotations) of the sub hydraulic motor (not illustrated) in the second direction corresponding to the limit feeding-in length of the sub wire rope 16.

When the filtering control signal Cd(n) is generated, the flow quantity computation part 33*f* of the control device 33 calculates the swivel flow angle γ of the boom 9 in the control by the filtering control signal Cd(n).

The flow quantity computation part 33*f* constantly calculates the swivel flow angle γ corresponding to the current swivel speed φb of the boom 9 operating based on the filtering control signal Cd(n).

The swivel flow angle γ is determined by adding the increase of the swivel flow angle γ due to the deceleration limit value Dcc to the product of the current swivel speed φb, load swing cycle T of the luggage W calculated from the resonance frequency ω(n) of the luggage W, and the load sway reduction rate Pnf determined from the notch width coefficient ζ and the notch depth coefficient δ.

That is, the swivel flow angle γ of the boom 9 increases as the current swivel speed φb of the boom 9 increases. Further, the swivel flow angle γ of the boom 9 increases as the load swing cycle T increases. The swivel flow angle γ of the boom 9 increases as the load sway reduction rate Pnf increases. The swivel flow angle γ may be regarded to correspond to the sum of the area of the shaded portion in FIG. 5 (the portion indicated by the arrow S1 in FIG. 5) and the area of the triangular portion indicated by the arrow S2 in FIG. 5.

When the notch filter F(n) is not applied to the control signal C(n), the flow quantity computation part 33*f* calculates the swivel flow angle γ of the boom 9 based on the current swivel speed φb of the boom 9 and deceleration time.

Hereinafter, the automatic stop control of the crane 1 performed when the operable range of the boom 9 of the crane 1 is set will be specifically described with reference to FIGS. 6 and 7.

Figure 6:
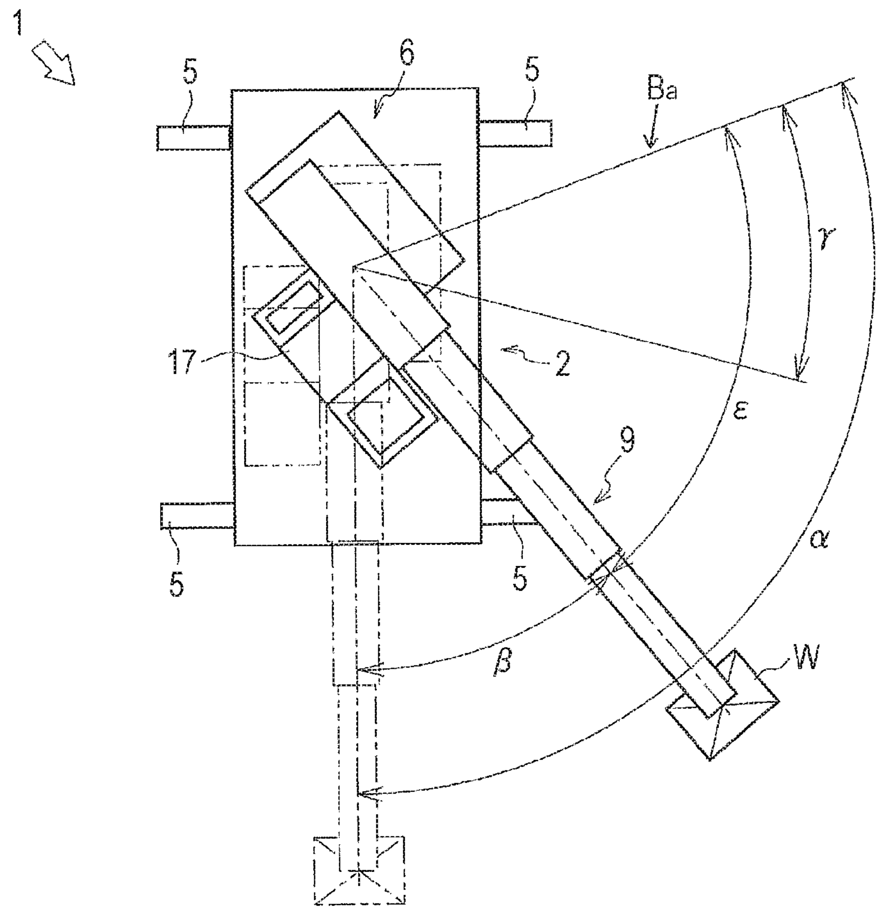
FIG. 6 is a schematic plan view illustrating a relationship among a limit swivel angle, a swivel angle, and a swivel flow angle.

As illustrated in FIG. 6, a line extending from the swivel center of the boom 9 in the forward direction of the crane 1 (dashed line in the drawing) is defined as the reference position of the swivel angle β of the boom 9 (hereinafter, referred to as the boom 9 reference position).

In the plan view of the crane 1 illustrated in FIG. 6, the swivel angle β increases as the boom 9 moves from the reference position of the boom 9 in the counterclockwise direction (hereinafter referred to as a first swivel direction). Further, the range of the swivel angle at which the swing of the boom 9 is permitted is referred to as an operable range of the swing of the boom 9.

The crane 1 is in a state of controlling the swiveling hydraulic motor 8 based on the filtering control signal Cd(n)

(a state of swivel operation). In other words, the boom 9 of the crane 1 is in a state of operating (swiveling) based on the filtering control signal Cd(n).

The operable range of the swing of the boom 9 is set by the work range setting device 34 or the range setting part 33*e* (see FIG. 2) of the control device 33.

In this embodiment, the operable range of the swing of the boom 9 is automatically set by the range setting part 33*e* based on the information regarding the posture of the crane 1 such as the derricking angle of the boom 9, the length of the boom 9, and the swivel angle of the jib 9*a*, and the weight Wt of the luggage W.

A boundary position $B_a$ in FIG. 6 indicates a boundary position in a range in which the boom 9 can turn in the first swivel direction from the reference position of the boom 9 in the operable range regarding swiveling. The boundary position $B_a$ corresponds to the boundary between the operable range and the regulation range. Further, the angle at which the boom 9 can turn in the first swivel direction from the reference position of the boom 9 is the limit angle α.

The operable range of the boom 9 for swiveling is not, limited to that automatically set by the range setting part 33*e* of the crane 1. For example, the operator may operate the work range setting device 34 to set the operable range of the boom 9 for swiveling. That is, the operable range of the boom 9 may be set automatically or manually.

The flow quantity computation part 33*f* of the control device 33 may calculate the swivel flow angle γ of the boom 9 based on, as an example, the current swivel speed φb of the boom 9, the load swing cycle T, the load sway reduction rate Pnf, and the predetermined deceleration limit value Dcc.

It may be considered that the swivel flow angle γ is calculated from an equation using the swivel speed φb, the load swing cycle T, the load sway reduction rate Pnf, and the deceleration limit value Dcc as parameters. The method for calculating the swivel flow angle γ is not limited to the above method.

The determination part 33*g* of the control device 33 calculates the swivel angle β that is the current operation quantity of the boom 9 from the acquired operation state of the crane 1.

The swivel angle β may be regarded as indirectly indicating the current operation quantity of the swiveling hydraulic motor 8. The current operation quantity of the swiveling hydraulic motor 8 may be regarded as the operation quantity (total number of rotations) of the swiveling hydraulic motor 8 when the boom 9 has swung from the reference position to the swivel angle β.

The determination part 33*g* also acquires the limit swivel angle α, which is information regarding the target stop position, from the range setting part 33*e*. In this embodiment, the limit swivel angle α corresponds to the limit operation quantity of the swiveling hydraulic motor 8. The limit operation quantity of the swiveling hydraulic motor 8 may be regarded as the operation quantity (total number of rotations) of the swiveling hydraulic motor 8 when the boom 9 has swung from the reference position to the limit swivel angle α.

The determination part 33*g* acquires the swivel flow angle γ, which is information regarding the flow quantity of the boom 9, from the flow quantity computation part 33*f*. The determination part 33*g* calculates a margin angle ε which is an angle from the current swivel angle β to the limit swivel angle α. The determination part 33*g* determines whether the margin angle ε is less than or equal to the swivel flow angle γ.

In other words, the determination part 33*g* determines whether the difference between the current operation quantity of the swiveling hydraulic motor 8 operating the boom 9 and the limit operation quantity of the swiveling hydraulic motor 8 is equal to or less than the flow quantity (the number of rotations) of the motor 8 corresponding to the swivel flow angle γ.

When the margin angle ε is equal to or smaller than the swivel flow angle γ, the control device 33 generates the automatic stop signal C(na) corresponding to the swivel valve 23 and outputs the signal to the swivel valve 23. That is, the automatic stop signal C(na) is input to the swivel valve 23 when the margin angle ε is equal to or less than the swivel flow angle γ. As a result, the swivel operation of the crane 1 is automatically stopped based on the automatic stop signal C(na).

As described above, the crane 1 always determines whether to start deceleration based on the swivel flow angle γ calculated from the current swivel speed φb and the current swivel angle β . Therefore, in the crane 1, the boom 9 does not enter the regulation range even if the swivel speed φb of the boom 9 or the like changes.

As a result, the crane 1 can stop the boom 9 at a desired position (target stop position) in the control the filtering control signal in which the frequency component is attenuated to suppress the vibration of the luggage W.

In the above configuration, the automatic stop control in which the swiveling hydraulic motor 8 is controlled has been described, but the control target is not limited to the swiveling hydraulic motor 8. The controlled object may be an actuator other than the swiveling hydraulic motor 8.

Next, an embodiment of the automatic stop control will be described with reference to FIG. 7. In the following automatic stop control, it is premised that the crane 1 is performing the vibration suppression control based on the filtering control signal Cd(n). Further, the filter coefficients such as the notch width coefficient ζ and the notch depth coefficient δ, the resonance frequency ω(n), and the operable range regarding the swiveling of the boom 9 are set based on the information regarding the operation state of the crane 1 and the information regarding the weight Wt of the luggage W. Further, the automatic stop control ends when the operator manually stops the swivel operation signal.

Figure 7:
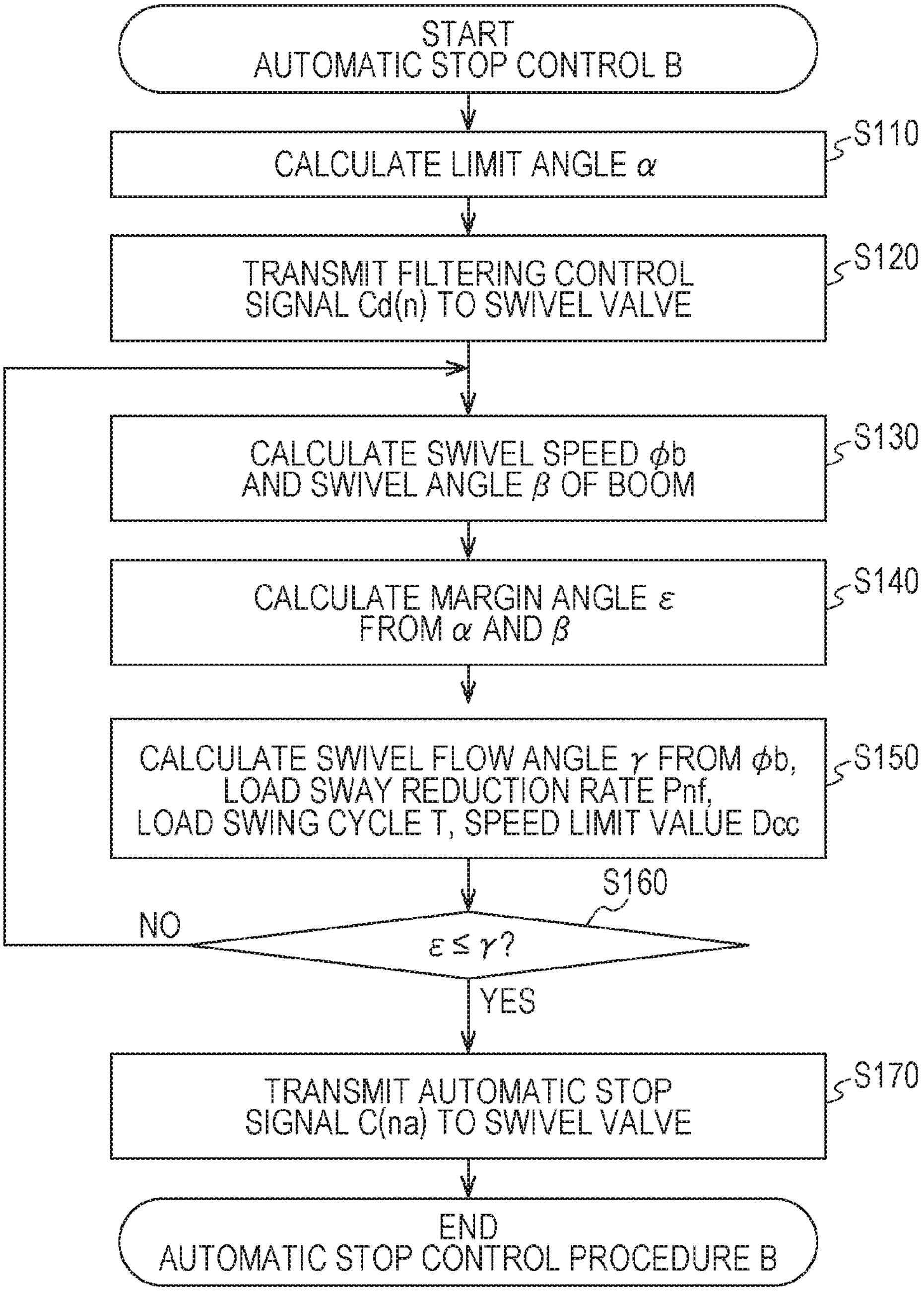
FIG. 7 is a flowchart illustrating automatic stop control.

In Step S110 of FIG. 7, the control device 33 calculates the limit swivel angle α based on the set operable range for swiveling. The limit swivel angle α corresponds to an example of information regarding the target stop position. Then, the control device 33 shifts the control processing to Step S120.

In Step S120 of FIG. 7, the control device 33 generates the filtering control signal Cd(n) based on the operation signal acquired from the operation tool such as the swivel operation tool 18. Then, the control device 33 sends the generated filtering control signal Cd(n) to the corresponding actuator (in this example, the swivel valve 23). Thereafter, the control device 33 shifts the control processing to Step S130.

In Step S130 of FIG. 7, the control device 33 calculates the current swivel speed φb of the boom 9 and the current swivel angle β of the boom 9 based on the information regarding the swivel angle acquired from the swivel sensor 27. The current swivel angle β the boom 9 corresponds to an example of information regarding the present position. Then, the control device 33 shifts the control processing to Step S140.

In Step S140 of FIG. 7, the control device 33 calculates the margin angle ε based on the limit swivel angle α and the swivel angle β. Then, the control device 33 shifts the control processing to Step S150.

In Step S150 of FIG. 7, the control device 33 calculates the load sway reduction rate Pnf based on the current swivel speed φb of the boom 9, the notch width coefficient ζ and the notch depth coefficient δ, the load swing cycle T based on the resonance frequency ω(n), and the swivel flow angle γ from the deceleration limit value Dcc. The swivel flow angle γ corresponds to an example of information regarding the flow quantity. Then, the control device 33 shifts the control processing to Step S160.

In Step S160 of FIG. 7, the control device 33 determines whether the margin angle ε is less than or equal to the swivel flow angle γ. In Step S160, when the margin angle ε is equal to or smaller than the swivel flow angle γ ("YES" in Step S160), the control device 33 shifts the control processing to Step S170.

On the other hand, when the margin angle ε is larger than the swivel flow angle γ in Step S160 ("NO" in Step S160), the control device 33 shifts the control processing to Step S130.

In Step S170 of FIG. 7, the control device 33 generates the automatic stop signal C(na) corresponding to the swivel valve 23 and transmits the signal to the swivel valve 23. As a result, the swivel operation of the crane 1 is automatically stopped.

The automatic stop signal C(na) may be a basic automatic stop signal that is not filtered by the notch filter F(n). Further, the automatic stop signal C(na) may be a filtered automatic stop signal that is filtered by the notch filter F(n).

When the automatic stop signal C(na) is the basic automatic stop signal, the basic automatic stop signal is, for example, a control signal corresponding to time t0 to time t1 in the basic control signal C(n) illustrated in FIG. 5.

If the basic automatic stop signal is used as the automatic stop signal C(na), the time from the input of the automatic stop signal C(na) to the stop of the swing of the boom 9 can be shortened. However, the boom 9 stops before the position corresponding to the limit swivel angle α.

When the automatic stop signal C(na) is the filtered automatic stop signal, the filtered automatic stop signal is, for example, a control signal corresponding to time t0 to time t2 in the filtering control signal Cd(n) illustrated in FIG. 5.

If the filtered automatic stop signal is used as the automatic stop signal C(na), the boom 9 can be stopped at a position corresponding to the limit swivel angle α.

The control device 33, for example, monitors the surroundings of the crane 1 in real time, and selects whether to use the basic automatic stop signal or the filtered automatic stop signal based on the change in the surroundings. Further, the operator may preset whether to use the basic automatic stop signal or the filtered automatic stop signal. The control device 33 may select the basic automatic stop signal or the filtered automatic stop signal based on a preset condition.

In this embodiment, the swivel flow angle γ of the boom 9 is calculated by adding the increase of the swivel flow angle γ by the deceleration limit value Dcc to the product of the current swivel speed φb, the load swing cycle T of the luggage W, and the load sway reduction rate Pnf.

Of these, the load sway reduction rate Pnf and the deceleration limit value Dcc can be set as unique values for each model. Therefore, the swivel flow angle γ is uniquely determined from the combination of the current swivel speeds φb(1), φb(2), . . . , φb(m) and the suspension lengths L(1), L(2), . . . , L(n) of the main wire rope 14 or the sub wire rope 16 which calculates the load swing cycle T.

In other words, a swivel flow angle map M as illustrated in FIG. 8 can be created by using linear interpolation with the swivel speed φb(1) to the swivel speed φb (m) and the suspension length L(1) to the suspension length L(n) as variables for each model.

Accordingly, the crane 1 is provided with the swivel flow angle map M corresponding to the model, so a swivel flow angle γ(xy) can be selected based on the swivel flow angle map M from the detected current swivel speed φb(x) and the suspension length L(y).

The swivel flow angle map M includes the swivel speed φb(x), the suspension length L(y), and the swivel flow angle γ(xy) associated with swivel speed φb(x) and suspension length L(y). The swivel flow angle map M may be stored in a storage part (not illustrated) of the control device 33 or the like. The swivel flow angle map M may be regarded as a map related to swiveling of the boom 9. However, the map is not limited to a map related to swiveling, and may be a map related to various operations (extension/contraction) of the operable function part (for example, the boom 9).

In the vibration suppression control according to the invention, the center frequency ωc(n) that is the reference of the notch filter F(n) applied to the control signal C(n) is set to a composite frequency of a unique vibration frequency excited when the structure of the crane 1 vibrates by arm external force and the resonance frequency ω(n). Therefore, not only the vibration due to the resonance frequency ω(n) but also the unique vibration frequency of the structure of the crane 1 can be suppressed.

Here, the unique vibration frequency may include the vibration frequency such as the unique frequencies of the boom 9 in the derricking direction and the swivel direction, the unique frequency due to the twist around the axis of the boom 9, the resonance frequency of a double pendulum composed of the main hook block 10 or the sub hook block 11 and the slinging work wire rope, and the unique frequency at the time of extension/contraction due to the extension of the main wire rope 14 or the sub wire rope 16.

In the vibration suppression control according to the invention, the crane 1 attenuates the resonance frequency ω(n) of the control signal C(n) by the notch filter F(n). However, the filter may be a filter that attenuates a specific frequency such as a low-pass filter, a high-pass filter, a band-stop filter, or any other.

The above-described embodiments merely show typical forms, and various modifications can be carried out without departing from the gist of one embodiment. Needless to say, the invention can be implemented in various forms, and the scope of the invention is represented by the description of the claims, and further, the equivalent meanings described in the claims and all changes of the scope of the invention are included.

REFERENCE SIGNS LIST

1 crane
10 main hook block
10*a* main hook
11 sub hook block
11*a* sub hook
12 derricking hydraulic cylinder
13 main winch
14 main wire rope
15 sub winch
16 sub wire rope

17 cabin
18 swivel operation tool
19 derricking operation tool
20 telescopic operation tool
21 main drum operation tool
22 sub drum operation tool
2 vehicle
23 swivel valve
24 telescopic valve
25 derricking valve
26*m* main operating valve
26*s* sub operating valve
27 swivel sensor
28 telescopic sensor
29 weight sensor
3 wheel
31 main feeding-out length detection sensor
32 sub feeding-out length detection sensor
33 control device
33*a* control signal generation part
33*b* resonance frequency computation part
33*c* filter part
33*d* filter coefficient computation part
33*e* range setting part
33*f* flow quantity computation part
33*g* determination part
34 work range setting device
4 engine
5 outrigger
6 crane device
7 swivel base
8 swiveling hydraulic motor
9 boom
9*a* jib

The invention claimed is:

1. A crane, comprising:

a boom;

an actuator that drives the boom;

a generation part that generates a first control signal of the actuator;

a filter part that filters the first control signal to generate a second control signal;

a control part that controls the actuator based on the second control signal; and a computation part that calculates, in a case where a stop signal is input to the actuator at a present position of the boom, information regarding a flow quantity estimated when the boom moves from after the stop signal is input to the actuator until an operation of the boom stops, wherein, in the control based on the second control signal, the control part acquires information regarding a present position of the boom, information regarding a target stop position, and information regarding the flow quantity, outputs the stop signal to the actuator in a case where a difference between a limit movement quantity and a first movement quantity is equal to or less than a first flow quantity, and stops the boom at the target stop position based on the stop signal, wherein the information regarding the present position is a first operation quantity of the actuator corresponding to a movement quantity of the boom moved from a first reference position, wherein the information regarding the target stop position is a limit operation quantity of the actuator corresponding to the limit movement quantity in which the boom can move from the first reference position, wherein the first flow quantity is the flow quantity in which the boom moves from when the stop signal is input to the actuator until the boom stops, wherein the first movement quantity is the movement quantity of the boom moved from a first reference position, wherein the information regarding the flow quantity is a second operation quantity of the actuator corresponding to the estimated flow quantity, wherein, in the control based on the second control signal, the control part outputs the stop signal to the actuator in a case where a difference between the limit operation quantity and the first operation quantity is equal to or less than the second operation quantity, and wherein the generation part, the filter part, the control part, and the computation part are each implemented via at least one processor.

2. The crane according to claim 1, wherein the operation is any one of a swiveling operation, a telescopic operation, and a derricking operation of the boom that is the boom.

3. The crane according to claim 2, wherein the information regarding the present position is a swivel angle at which the boom swings from a first reference position, wherein the information regarding the target stop position is a swivel angle at which the boom can swing from the first reference position, and wherein the information regarding the flow quantity is a swivel angle estimated when the boom swings from after the stop signal is input to the actuator until the swing of the boom stops.

4. The crane according to claim 1, wherein the target stop position is a boundary between an operable range in which the operation of the boom is permitted and a regulation range in which the operation of the boom is prohibited.

5. The crane according to claim 1, further comprising:

a resonance frequency computation part that calculates a resonance frequency for a wire rope that hangs a hook from a tip of a boom that is the boom, wherein the filter part generates a filter based on the resonance frequency, wherein the filter has a function of attenuating, from the first control signal, a frequency component in a predetermined frequency range at a predetermined rate with the resonance frequency as a reference, wherein the resonance frequency computation part is implemented via at least one processor.

6. The crane according to claim 5, wherein the filter part generates the filter based on a composite frequency of the resonance frequency and a unique frequency of the boom, and wherein the filter has a function of attenuating, from the first control signal, a frequency component in a predetermined frequency range at a predetermined rate with the composite frequency as a reference.

7. The crane according to claim 5, wherein the filter is a notch filter, and wherein the computation part calculates information regarding the flow quantity based on a movement speed of the boom or the actuator, the resonance frequency, a load sway reduction rate determined based on a notch width coefficient and a notch depth coefficient of the notch filter, and a deceleration limit value which is a deceleration in the stop signal.

8. The crane according to claim 1, wherein the computation part calculates information regarding the flow quantity from a map stored in advance.

9. A crane control method which is performed in a crane including a boom, an actuator that drives the boom, a generation part that generates a first control signal of the actuator, a filter part that filters the first control signal to generate a second control signal, and a control part that controls the actuator based on the second control signal, the crane control method comprising:

calculating, in a case where a stop signal is input at a present position of the boom, information regarding a flow quantity estimated when the boom moves from after the stop signal is input to the actuator until an operation of the boom stops;

acquiring information regarding a present position of the boom, information regarding a target stop position, and information regarding the flow quantity;

outputting, in the control based on the second control signal, the stop signal to the actuator in a case where a difference between a limit movement quantity and a first movement quantity is equal to or less than a first flow quantity; and stopping the boom at the target stop position based on the stop signal, wherein the information regarding the present position is a first operation quantity of the actuator corresponding to a movement quantity of the boom moved from a first reference position, wherein the information regarding the target stop position is a limit operation quantity of the actuator corresponding to the limit movement quantity in which the boom can move from the first reference position, wherein the first flow quantity is the flow quantity in which the boom moves from when the stop signal is input to the actuator until the boom stops, wherein the first movement quantity is the movement quantity of the boom moved from a first reference position, wherein the information regarding the flow quantity is a second operation quantity of the actuator corresponding to the estimated flow quantity, and wherein the outputting, in the control based on the second control signal, includes the outputting the stop signal to the actuator in a case where a difference between the limit operation quantity and the first operation quantity is equal to or less than the second operation quantity.

* * * * *